United States Patent [19]

Laine et al.

[11] Patent Number: 4,792,209

[45] Date of Patent: Dec. 20, 1988

[54] PROJECTION SCREEN

[76] Inventors: Curtis S. Laine, 1068 Chatsworth St., N., St. Paul, Minn. 55103; Ronald G. Dow, 7740 Sierra Parkway, N., Brooklyn Park, Minn. 55444

[21] Appl. No.: 130,117

[22] PCT Filed: Jun. 1, 1987

[86] PCT No.: PCT/US87/01301

§ 371 Date: Oct. 1, 1987

§ 102(e) Date: Oct. 1, 1987

[87] PCT Pub. No.: WO87/07398

PCT Pub. Date: Dec. 3, 1987

Related U.S. Application Data

[63] Continuation-in-part of Ser. No. 868,712, May 30, 1986, abandoned.

[51] Int. Cl.$^4$ ............................................. G03B 21/56
[52] U.S. Cl. .................................................... 350/117
[58] Field of Search ...................... 350/117, 127–129; 355/71; 354/77; 352/41

[56] References Cited

U.S. PATENT DOCUMENTS

| | | | |
|---|---|---|---|
| 2,004,798 | 6/1935 | Poser | 355/71 X |
| 2,242,567 | 5/1941 | Bodde | 350/127 X |
| 2,362,573 | 11/1944 | MacNeille | 350/129 |
| 2,368,099 | 1/1945 | Bodde | 350/126 |
| 4,201,449 | 5/1980 | Campion et al. | 350/117 |
| 4,374,609 | 2/1983 | Lange | 350/128 |
| 4,466,735 | 8/1984 | Nelson | 355/71 |
| 4,652,084 | 3/1987 | Daszinnies | 350/117 |

OTHER PUBLICATIONS

"The Stereo Black Screen", Film 79, by Paul McGurk.

*Primary Examiner*—Richard A. Wintercorn
*Attorney, Agent, or Firm*—Barnes & Thornburg

[57] ABSTRACT

A slide projection screen is disclosed which is designed to facilitate video recording of projected images. To accommodate for varied light intensity levels, the screen resulting from the optic projection by a slide projector, a compensating layer is provided on the screen. The compensating layer is made by preparing a master film image corresponding to the average light intensity pattern from a slide projector and using the master film image to expose a photo emulsion layer on the screen being made. Certain embodiments include a light absorbing layer to compensate for light scattering halation effects.

29 Claims, 2 Drawing Sheets

PROJECTION SCREEN

CROSS REFERENCE TO RELATED APPLICATION

This application is a continuation-in-part application of U.S. patent application Ser. No. 868,712, filed May 30, 1986, abandoned.

BACKGROUND AND SUMMARY OF THE INVENTION

The present invention relates to projection screens and more particularly to projection screens having a surface which compensates for projected variations in light intensity levels which are imperceptible to the human observer but are detectable by video reproduction of an image on the screen. The invention also relates to a method for making such projection screens, as well as methods of projecting an image onto such screens.

The projection of slide images on screens is well known. A common problem with such slide projection is that the image projected on the screens tends to be brightest at the center of the screen and dimmest on the edges.

This phenomena is caused by the geometry and optics of conventional slide projectors in that the projector light source projects outward with a beam of light which is in the shape of a sector of a sphere. Since the screen intersects this sphere sector of light with a flat plane, the center of the screen is closer to the light source than the edges. This results in the brightest image portion at the center, with decreasing brightness radially outward therefrom. This phenomena is sometimes termed the "halo" effect.

To the human observer, the halo effect light intensity difference on the screen is imperceptible because the human brain has the capacity to adjust for light intensity variations greater than the differential between the center of the screen and the edges of the screen. Thus, although the human eye can discern the light variations as well as, if not better than, conventional video cameras can, the human brain adjusts for these light variations and the human observer does not perceive these variations. However, reproduction of these projection slide screen images by a video camera detects and records these varying light intensity levels as these video cameras have less capacity to adjust to the varying light levels than the human brain. Therefore, these video cameras will reproduce an image which shows the variation in light intensity to an extent that the video image then includes variations that are Perceptible to the human observer of the video images. Depending on various adjustments, the video image might appear to be of a normal light intensity at the center an appear dark at the edges or might appear to be normal at the edges and excessively bright at the center.

Although the human brain can adjust or accommodate for some of these video recorded light intensity variations, the quality and uniformity of the video signals, as perceived, is lower than would be the case if these slide projector induced light intensity variations were not existent in the video images.

Various methods are presently available which approach the varying light intensity problem by adjusting the light intensity before the light beam reaches the screen. Some methods involve placing a light filter in the path of the light beam between the projector and the screen. These methods require attachments to or adjustments in the video equipment filming the projected image on the screen. Further, these existing processes could easily add few thousand dollars to the cost of a professional quality video recording. A much less expensive approach for reproducing a uniform light intensity video image from a projection screen would be to adjust for the problem on the projection screen itself. Having a projection screen which adjusts for the varying light intensity problem would allow professional quality video recording by a normal video recorder for an indefinite period of time.

A translucent type screen, which adjusts for the varying light intensity problem is shown in U.S. Pat. Nos. 2,242,567 and 2,368,099. In these screens, still or motion pictures are projected on one side of a screen and viewed or photographed on the opposite side of the screen. A transparent base is first coated with a uniform layer of a material which includes microscopic light polarizing crystals. To compensate for the increased intensity at the center of the screen, successive layers of the coating material are applied in a rectangular pattern to produce Progressive increases in thickness of the layer as measured from the edges to the center of the screen. During the operation of spraying the crystal layers, a suitable projector is employed to project a beam of light upon the back surface of the screen. The operator then attempts to spray the successive crystal layers in a rectangular pattern so that a constant intensity over the entire area of the screen is achieved.

There are many problems inherent in the translucent screen discussed above. First, this device only approaches the problem for translucent screens where the image is projected from one side of the screen and viewed from the opposite side of the screen. The successive layers of the coating material which are thicker in the center of the screen and progressively decrease in thickness toward the outer edge of the screen only provide an increased density of quartz crystals in the center of the screen. The increased density in the center of the screen decreases the amount of light which is allowed to pass through the translucent screen. This method of increasing the density of crystals in a translucent screen would not presume a solution for the varying light intensity problem on a screen wherein the projected and viewed image are on the same side.

There are additional problems presented with respect to the methods of constructing the screen. Many coats of the crystal layers are required to achieve an effective density distribution. As stated in the patents, about six to eight coats of the quartz mixture are first evenly applied over the entire surface of the base, then about four or five coats may be applied over a smaller area, next about ten coats may be applied over a still smaller area, next about six coats are applied over the next area, and finally about six coats are applied to the center area of the screen. In all, the preferred embodiment of this invention includes 32-35 coats sprayed on the translucent screen.

Further, during the process of spraying these many coats on the screen, the operator must continually view the light projected through the screen to try and determine if the correct density pattern has been applied. The problems with this procedure are at least twofold. First, as discussed above, often the varied light intensity levels may not be perceived by the human observer. To assure that varying light intensity which is detectable by cameras will be adjusted for, constant video reproduction would be required during the coating process. Second, even if constant video reproduction was provided during the coating process, it would be extremely difficult to achieve an accurate layer by applying rectangular coats, as it is very likely that the light intensity pattern from the projector may have a different geometrical shape, such as spherical or circular to conform to the sphere of light projected from the slide projector.

Another problem encountered in video reproduction of a slide screen image is the so called "halation" effect caused by irregular reflection surfaces at the screen causing a scattering of the reflected light and consequent blurring of the image. The irregular slide screen surface is intentionally designed to accommodate viewing of same by a large audience with different observer locations at different angles with respect to the screen. Without such scattering, the observers located at the edges of the room would not be able to discern a clear image when those in the center of the room in line with the projector light source would see a clear image reflected back. For video recording, there is effectively only one observer at one location, the video camera, and thus the light scattering irregular screen surface features are not needed to improve peripheral viewing as would be the case for normal slide viewing. Thus, one aspect of the invention is to decrease this halation effect to a minimum by appropriate construction of the screen.

A screen has been provided which attempts to decrease light scattering at the reflecting surface due to the irregular nature of the reflecting medium when compared with the wavelength of light. This screen also addresses the problem of reflected ambient light. In this screen 12 layers of the scales of the Scabbard fish are provided on the screen surface. Each layer reflects about 10% of the light falling upon it and 90% of the light passes through to the next layer. The reflected image is made up of 12 successive reflections which all emerge along the same axis. Any remaining ,incident light which is not reflected is absorbed by a black backing material which acts similarly to the antihalation backing layer of film.

Other screens have been constructed which confront reflection problems in images by providing varied textures in the screen. U.S. Pat. No. 2,362,573 shows a screen having lenticular elements in the surface with a reflective material overlay. The lenticular elements intercept all incident light and allow only the light from a projector to be reflected. U.S. Pat. No. 4,089,587 shows a screen having a surface having a combination of random mat texture and a substantially unidirectional striated texture.

The screens discussed above, addressing reflective problems in image reproduction on a screen, all approach the problem by layers having different textures or light reflecting elements such as fish scales or lenticular layers. The present invention adjusts for the halation effect with a smooth one color screen.

Therefore, an object of the present invention is to provide a projection screen which projects an image suitable for reproduction by a video camera.

A further object of the invention is to provide an image projecting screen which compensates for the so called "halo effect" caused by projected variation in light intensity levels imperceptible to the human observer, but detectable and reproduceable by video reproduction of an image on the screen.

Another object of the invention is to provide an image projection screen which compensates for the light scattering so called "halation effect" around the slide image when reproducing the image by a video camera.

Another object of the invention is to provide a relatively inexpensive, efficient and simple method of making an image projector which compensates for the halo effect caused by variation in light intensity levels imperceptible to the human observer but detectable and reproduceable by video reproduction of an image by a video camera.

According to certain preferred embodiments of the invention, an image projector screen is provided having a substrate and a darkened compensating layer on the substrate which compensates for the halo effect caused by projected variations in light intensity levels imperceptible to the human observer, but detectable and recordable by video reproduction of an image on the apparatus.

According to certain preferred embodiments of the invention, an image projection screen is provided with a substrate having a darkened absorbing layer applied to the substrate to minimize the halation effect. This darkened absorbing compensating layer device absorbs interfering light and reduces light scattering otherwise detectable by video reproduction of the image and, therefore, results in a clearer, sharper video image.

Certain preferred embodiments of the invention include both the compensating layer and the absorbing layer. Other contemplated embodiments of the invention include only one of these layers.

Certain preferred methods of manufacturing a slide projector screen according to the invention, include applying a darkened compensating surface to a substrate which compensates for the halo effect caused by projected variations in light intensity levels having an intensity imperceptible to the human observer but detectable by video. An image is then projected on this apparatus. In especially preferred methods of constructing the screen, a grey oil base surface is silk-screened on a substrate. A gelatinous photographic emulsion layer having a light sensitivity similar to photographic film is then applied. The photographic emulsion layer is then exposed to light by using a positive film image of a predetermined average projection pattern of an image projector. The photographic emulsion layer, when developed and fixed, forms a very accurate reverse image of the average projection pattern projected thereon and thereby compensates for the halo effect in a single manner.

In especially preferred embodiments, the positive film image which is used to expose the emulsion layer on the slide projection screen is made by the sequential steps of:

i. setting up a slide projection screen and slide projector with a still camera mounted on or adjacent the slide projector;

ii. using a test slide to focus the slide image on the screen;

iii. removing the test slide and leaving the slide projector light on;

iv. using the still camera to photograph the illuminated screen; and v. using the negative of step iv. to expose another film sheet to make a master positive film sheet.

The positive sheet film image is then used to expose the emulsion layer on the projection screen being manufactured.

Other objects, advantages and novel features of the present invention will become apparent from the following detailed description of the invention when considered in conjunction with the accompanying drawings.

DETAILED DESCRIPTION OF THE DRAWINGS

Figure 1:
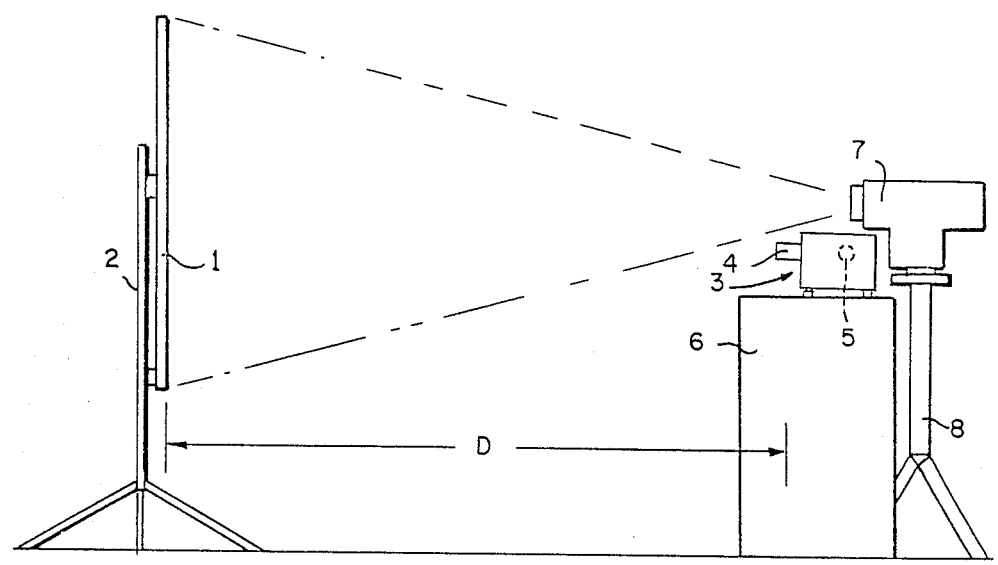
FIG. 1 is a schematic view depicting an arrangement for videotaping a slide projected on a projection screen constructed in accordance with preferred embodiments of the present invention.

FIG. 1 schematically depicts an arrangement for videotaping and filming of slides projected on a projection screen so that they can be shown on video TV displaying devices and the like. The slide projection screen 1 is mounted on a support 2 and is spaced a distance D from a slide projector 3 which projects slides onto the surface of the screen 1 via projector lens 4 and light source 5 in the slide projector. The slide projector 3 can be mounted on a suitable slide projector stand 6. For videotaping the slides, a video camera 7 is disposed at a position behind and aligned with the slide projector 3 so that it views the slide projection screen 1 in an ideal centrally located position. The camera 7 is preferably mounted on a camera tripod or support 8. The overall arrangement depicted in FIG. 1 is generally known. The preferred embodiments of the present invention relate to the projection screen design for the projection screen 1 so as to improve the fidelity of the videotaped and filmed images that result.

Figure 2:
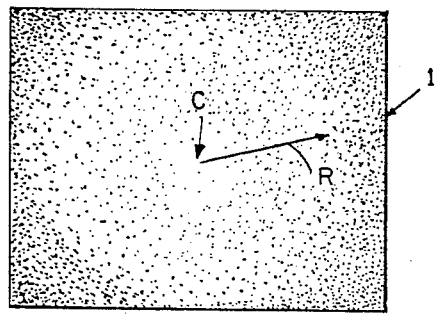
FIG. 2 is a schematic front view of a projection screen, depicting varying light intensity distribution patterns resulting when a slide is projected thereon by a conventional slide projector.

FIG. 2 schematically depicts the front fact of the screen 1 with the distribution of light intensity over the surface of the screen, starting with maximum light intensity at the center C and diminishing light intensity as one goes radially outward along the radius R. In FIG. 2, the circles of light intensity are shown in dash lines outside of the edges of the screen. It should be understood from A. Since the light source 5 as focused and projected via the lens 4 of the slide projector 3 is an effective point source of light directed in the direction toward the projection screen 1, the light intensity is strongest at the center of the screen and decreases radially in the outward direction of the radius R to minimum values at the corners and edges of the screen 1.

The film or video camera 7 effectively views and records the image on the screen 1, including the varying light intensity discussed above which results from the geometry of the slide projection onto the flat screen. Thus, the video images include a so called halo effect which includes this light intensity variation, thus affecting the quality of the video image when these are again viewed by human observers.

The use of a conventional slide screen 1 for the purposes of accommodating the video recording also results in light scattering or halation effects which effect the sharpness of the resultant video image. Especially with an intentionally roughened projection screen 1 for accommodating viewing of the projection screen at various angles inside of a projection room where only a few observers can be directly in the ideal central positions, this halation effect is aggravated, resulting in poor video images. Since the video camera 7 can be ideally positioned in line with the center of the projection screen 1, it is not necessary when preparing the video images of projected slides that any intentional roughening of the screen 1 be provided. The preferred embodiments as described below, relate to solving one and/or both of the problems due to the light intensity variation halo effect and the light scattering halation effect that otherwise results when videotaping slide Projector screen images.

Figure 3:
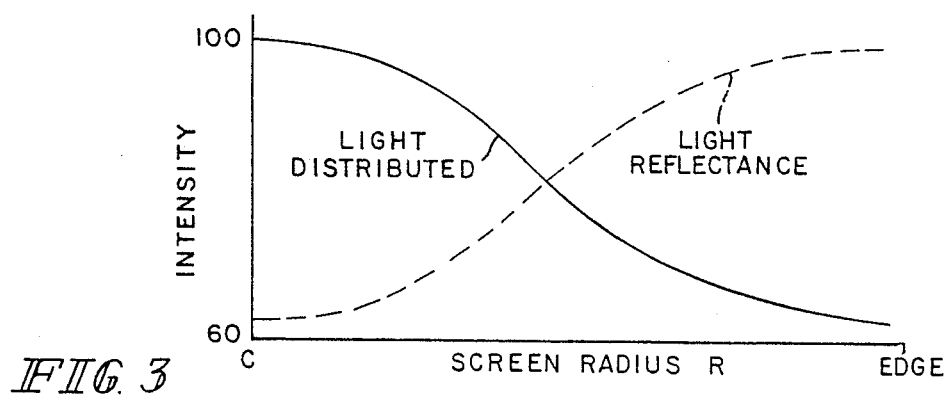
FIG. 3 is a graph showing the relationship between the brightness of light distributed on the surface of a projection screen from a slide projector as a function of the distance from the center point of the projection screen, as well as corresponding light reflectance characteristics of a projection screen constructed in accordance with preferred embodiments of the present invention.

FIG. 3 is a graph which has a solid line curve reflecting the light distribution pattern on the slide projection screen 1 if no compensation is made for the normal slide projector image. The dash line curve depicts the reflectance filter effect that would be required to compensate for this light distribution so as to have even light distribution over the surface of the projection screen.

Figure 4:
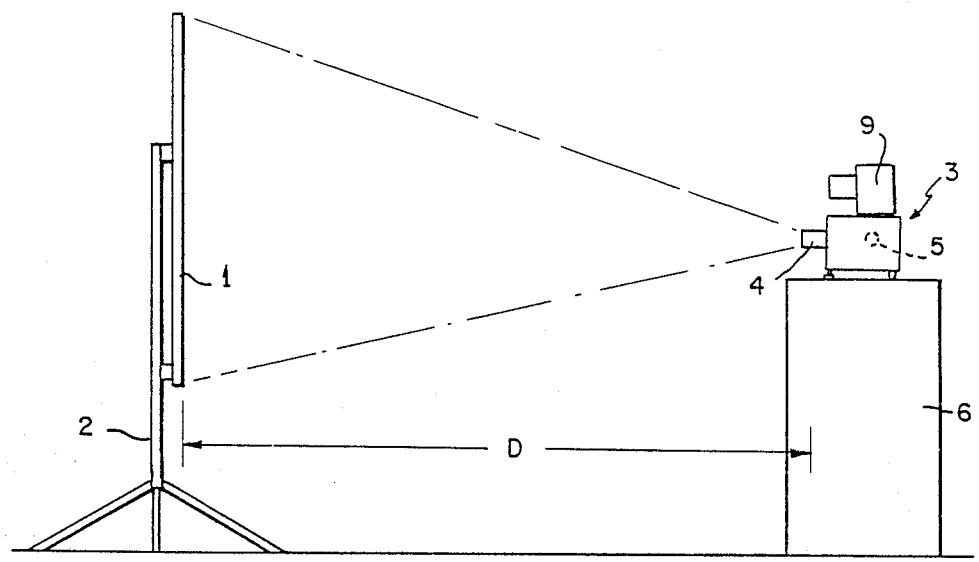
FIG. 4 is a schematic view depicting an arrangement for preparing a still camera film image of the slide projector screen, for use in manufacturing projection screens in accordance with preferred embodiments of the present invention.

FIG. 4 schematically depicts the arrangement of the slide projector and camera which is used to prepare a photographically produced halo effect compensating layer in the manufacture of a projection screen. In FIG. 4, the slide projector 3 projects an image on a conventional slide projection screen 1 which has no halo compensating layer or other means for accommodating the variation in light intensity pattern over the surface of the screen. A view camera 9, in preferred embodiments utilizing a 4"×5" or larger sheet film, is mounted in a fixed predetermined position at the slide projector and is used to take a photo image of the image on the screen 1 for purposes to be explained below. In order to be able to create a negative with the camera 9 which can accommodate various rectangular and square shaped screens 1, as well as various shaped slide images projected by the projector onto the screen 1 for the purposes of preparing video images, the process is carried out as follows:

i. First a standard test slide with a pattern that can facilitate clear focusing on the screen 1 is inserted into the slide projector 3 and is projected onto the screen 1 and the projector is appropriately focused for the distance D between the projector screen and the slide projector;

ii. The test pattern slide is then removed while leaving the light source 5 projected through the lens 4 onto the screen 1 at the set focus. This creates a pattern of light intensities over the surface of the screen corresponding to that described above for FIG. 2. The camera 9 is then used to photograph this screen. In preferred embodiments, the camera is a 4"×5" view camera with 4"×5" sheet film so as to be able to create a very high resolution negative of the light intensity pattern on the screen 1.

iii. The film from the camera 9 is then processed to form a negative, which negative is then photo exposed on a one-to-one basis to form a positive image 4"×5" master positive. This master positive is then used in a manner explained below to project an image onto a screen to be manufactured, which image corresponds to the light intensity pattern of conventional slide projectors.

Figure 5:
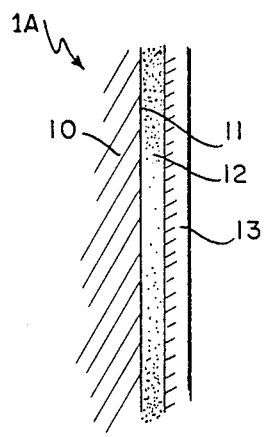
FIG. 5 is a partial cross-sectional view of a projection screen constructed in accordance with a first preferred embodiment of the invention and including a halo effect compensating layer formed by exposure and developing of a photo emulsion.

FIG. 5 schematically depicts the layers of a projection screen which is manufactured in accordance with a first preferred embodiment of the present invention. The projection screen 1A includes a first aluminum substrate layer 10 which has a predetermined flatness and gloss factor. This aluminum substrate layer 10 is then polished and anodized at its surface 11 so as to accommodate a silk-screen applied ink layer 12.

In preferred embodiments, the initial finish of the aluminum has a surface flatness before anodizing of 2 to 4 microinches ($10^{-6}$ inches) After anodizing, the surface roughness will be in the range of 6 to 7 microinches. After silk screening, gloss factors in the range of 6 to 20 are preferred.

In preferred embodiments, a silk-screen of 280 mesh or finer is used to apply the paint or tint layer 12. The actual color of the ink or paint is defined by a system designed by Pantone (PSM - Paint Matching System) and colors designated as 427U, 428U, 430U, 431U and 432U have been found acceptable. A photo emulsion layer 13 is then sprayed on the layer 12 in a predetermined thickness under controlled darkroom conditions so as to prevent exposure of the layer 13.

Following application and drying of the layer 13, the screen is placed in a predetermined position in a frame in a darkroom and is then exposed to a light pattern via the positive master image sheet of film discussed above. Subsequently, the screen 1A, including the emulsion layer 13, is subjected to developing, fixing and drying processes. In this manner, the resultant screen 1A includes an effective compensating filter layer 13 which conforms exactly to the light intensity pattern produced by conventional slide projectors, thereby compensating for the halo effects otherwise experienced in a simple and economical manner.

Figure 6:
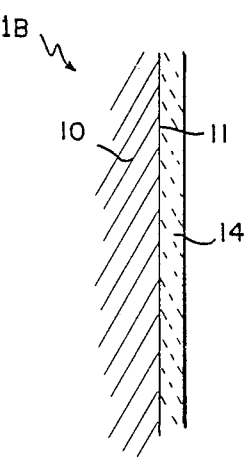
FIG. 6 is a partial cross-sectional view of a projection screen constructed in accordance with another preferred embodiment of the invention and including a blackened light absorbing layer for compensating for halation effect at the projection screen.

FIG. 6 depicts another preferred embodiment of a projection screen 1B, which is similar in all respects to the screen 1A, except instead of the photo emulsion layer 13 and the grey ink layer 12, a uniform black oil base surface layer 14 is applied using a silk-screen process. This layer 14 serves as an absorption layer for incidental light and minimizes the light scattering or halation effects, thereby improving the sharpness of the image as recorded when used to project slides that are recorded by videotaping apparatus.

Figure 7:
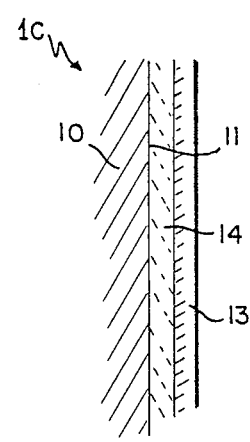
FIG. 7 is a partial schematic cross-sectional view of yet another preferred embodiment of a projection screen constructed in accordance with the present invention, including both a hal effect compensating layer and a halation effect compensating layer.

FIG. 7 schematically depicts a third preferred embodiment of a screen constructed according to the present invention, which is similar to the screen 1B of FIG. 6, with the further addition of a photo emulsion layer 13, such as described for the screen 1A of FIG. 5 on top of the darkened layer 14. With this FIG. 7 arrangement, both the advantages of accommodating for the halo effect and the advantages of accommodating for the halation effect are obtained.

In another embodiment of the invention, a master screen is produced by airbrushing. In this process, a TV camera lens and a slide projector are placed as close as possible to each other such that the axis of each is almost the same. Therefore, the TV camera gives an extremely accurate picture of the screen. The graphic artist airbrushes a predetermined density of ink darker than the surface of the screen on the screen while the TV camera views the screen. As the screen is being airbrushed, the artist views his work through a camera to see the results on the effect of the intensity.

In certain preferred embodiments, a wave form monitor is used to measure the intensity on the screen. A wave form monitor is the electronic representation of the output of the television camera. When using a blank, a hot spot or bright area in the center of the screen shows up as a peak in a bell curve. As the shaded airbrushed screen approaches the proper compensation for the brightness, this bell curve gradually reduced to a straight line which indicates an average brightness over the entire screen without a hot spot. The pattern thus achieved is accurately inverse of what naturally occurs on the screen.

This airbrush master is then used to produce the final product. A process camera is used to take an image of the airbrush master and reduce this image to product size. The film from the process camera is contact printed onto a piece of silk screen material which is light sensitive.

Preferred embodiments of this light-sensitive silk screen are made by pretreating the silk screen with an emulsion which is light sensitive. This emulsion is in the form of a latex which plugs the holes in the screen. The screen is then exposed to the pattern. Where light passes through,, the film sensitizes the emulsion on the screen which clears out the emulsion from the holes in the areas exposed to the light. Where there is no exposure to light, the holes continue to be plugged up with the latex.

Therefore, as discussed above with respect to the intensity pattern, there are more holes open toward the center of the silk screen than on the edges. The pattern is then silk screened over an aluminum plate such that the ink passes through onto the plate and prints the pattern onto the plate. The pattern produces a darker shade toward the middle which gradually decreases toward the edges such that the pattern absorbs just enough light to totally neutralize the hot spots.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Projection screen apparatus for displaying a projected image comprising:

a compensating layer on a backing means, said compensating layer having a varied reflectivity pattern for compensating for predetermined projected bright spot variations in light intensity levels generated by an image projector having variations imperceiveable to human observers and detectable by reproduction of an image on the apparatus.

2. Apparatus as in claim 1, wherein said projection surface reflectivity pattern is inverse to a pattern of light intensity produced by an image projector.

3. Apparatus as in claim 2, wherein said projection surface includes a center portion and edge portions, said projection surface reflectivity pattern increasing in darkness from said edge Portions into said center portion.

4. Apparatus as in claim 3, including a uniform tinted layer, and a photographic emulsion layer over said tinted layer for forming said compensating layer.

5. Apparatus as in claim 4, wherein said tinted layer includes an oil base surface applied by silk-screening.

6. Apparatus as in claim 4, wherein said photographic emulsion layer is exposed to a predetermined average projection pattern of an image projector.

7. Apparatus as in claim 6, wherein said tinted layer is grey.

8. Apparatus as in claim 6, wherein said tinted layer is black.

9. Apparatus as in claim 6, wherein said apparatus includes a viewing side and a nonviewing side, said viewing side receiving said projected image and displaying said image for viewing.

10. Apparatus as in claim 8, in which the tinted layer comprises a darkened surface for absorbing interfering reflected light to reduce light scattering effects for accommodating enhanced video recording of said image and reducing halation effects in the resultant video image.

11. Projection screen apparatus for projecting an image comprising:
a flat darkened absorbing layer on a backing means for absorbing interfering reflected light to reduce reflected light scattering effects for accommodating enhanced video recording of said image and reducing halation effects in the resultant video image.

12. Apparatus as in claim 11, wherein said flat darkened absorbing layer includes a black surface.

13. Apparatus as in claim 10, wherein said flat darkened absorbing layer includes a silk-screened black oil base surface.

14. A method of making projection screen apparatus for displaying projected image for video recording and the like, comprising:
making a darkened compensating layer on a backing means, said compensating layer having a varied reflectivity pattern for compensating for predetermined projected bright spot variations in light intensity generated by an image projector.

15. Method as in claim 14, wherein said making a darkened compensating layer includes producing a projection surface having a reflectivity pattern inverse to a predetermined average pattern of light intensity produced by an image projector.

16. Method as in claim 15, wherein said producing includes applying photo emulsion means to a substrate for developing the projection surface reflectivity pattern.

17. Method as in claim 16, wherein said applying of a photo emulsion means includes coating said substrate with a light sensitive photographic emulsion layer and exposing said emulsion layer to a predetermined average projection pattern of an image Projector, thereby developing a reflectivity pattern on said apparatus inverse to the projection pattern of the image projector.

18. Method as in claim 17, wherein said applying of said compensating means includes applying a tinted surface on said substrate prior to applying said light sensitive photographic emulsion layer.

19. Method as in claim 18, wherein said applying of said tinted surface includes silk-screening on oil base surface to said substrate.

20. Method as in claim 18, wherein said applying of a tinted surface includes applying a grey surface.

21. Method as in claim 18, wherein said applying of a tinted surface includes applying a black surface.

22. Method as in claim 17, further comprising preparing a positive film image, said positive film image serving as a master for exposing said emulsion layer.

23. Method as in claim 22, wherein said preparing a positive film image includes using a camera to photograph a standard slide projector light pattern image on a slide screen.

24. Method as in claim 14, comprising darkening of a screen surface while monitoring the screen surface with a TV camera.

25. Method as in claim 24, wherein said darkening includes applying darkening ink to the screen surface using manually operable airbrush.

26. Method as in claim 25, wherein said monitoring includes using a wave form monitor to analyze the light intensity pattern on the screen surface, said airbrushing being performed to produce substantially uniform average brightness over the surface of the screen surface with a standard slide projector lamp projection on the screen surface.

27. Method as in claim 26, further comprising using the airbrushed screen surface as a master surface for photographically replicating corresponding slide screen surfaces using silk-screen techniques.

28. A method of making projection screen apparatus for displaying a light projected image for video recording and the like comprising:
making a flat darkened absorbing layer on a backing means for absorbing interfering reflected light to thereby reduce reflected light scattering halation effects on the video recording of said image or the like.

29. Method as in claim 28, wherein said absorbing layer includes a coating on said substrate with a uniform black surface.

* * * * *